United States Patent
Wang

(10) Patent No.: US 10,430,365 B2
(45) Date of Patent: Oct. 1, 2019

(54) METHOD AND APPARATUS FOR RECONFIGURING PIN ASSIGNMENTS ON A CONNECTOR

(71) Applicant: Micro Motion, Inc., Boulder, CO (US)

(72) Inventor: Lingjun Wang, Nanjing (CN)

(73) Assignee: Micro Motion, Inc., Boulder, CO (US)

(*) Notice: Subject to any disclaimer, the term of this patent is extended or adjusted under 35 U.S.C. 154(b) by 48 days.

(21) Appl. No.: 15/119,781

(22) PCT Filed: Mar. 13, 2014

(86) PCT No.: PCT/CN2014/073347
§ 371 (c)(1),
(2) Date: Aug. 18, 2016

(87) PCT Pub. No.: WO2015/135170
PCT Pub. Date: Sep. 17, 2015

(65) Prior Publication Data
US 2017/0052918 A1 Feb. 23, 2017

(51) Int. Cl.
*H01R 29/00* (2006.01)
*G06F 13/40* (2006.01)
*G06F 13/38* (2006.01)

(52) U.S. Cl.
CPC ........ *G06F 13/4068* (2013.01); *G06F 13/385* (2013.01); *H01R 29/00* (2013.01)

(58) Field of Classification Search
None
See application file for complete search history.

(56) References Cited

U.S. PATENT DOCUMENTS

| | | | |
|---|---|---|---|
| 6,914,424 B2 | 7/2005 | Chi et al. | |
| 7,050,783 B2* | 5/2006 | Curtiss | H04B 1/3877 235/380 |
| 7,865,629 B1 | 1/2011 | Tantos et al. | |
| 7,944,223 B2 | 5/2011 | Chang et al. | |
| 2008/0140323 A1* | 6/2008 | Kumagai | G06F 17/5045 702/57 |
| 2008/0177904 A1* | 7/2008 | Storey | G06F 9/4411 710/10 |
| 2009/0158301 A1* | 6/2009 | Holan | G06F 9/4411 719/321 |
| 2010/0075604 A1* | 3/2010 | Lydon | G06F 21/31 455/41.3 |

(Continued)

FOREIGN PATENT DOCUMENTS

| | | |
|---|---|---|
| CN | 101738503 A | 6/2010 |
| EP | 2590274 A2 | 5/2013 |

(Continued)

*Primary Examiner* — Elias Mamo
(74) *Attorney, Agent, or Firm* — The Ollila Law Group LLC

(57) ABSTRACT

A method (700) for reconfiguring pin assignments on a connector (100) is provided. The method (700) includes reading a present accessory type (34a) from an accessory (30) coupled to the connector (100) having a plurality of pins (110) wherein the present accessory type (34a) is associated with an accessory pin assignment (31) of the connector (100), and comparing the present accessory type (34a) to a stored accessory type (18a) associated with a connector pin assignment (17) to determine if the accessory pin assignment (31) is compatible with the connector pin assignment (17).

18 Claims, 7 Drawing Sheets

(56) References Cited

U.S. PATENT DOCUMENTS

| | | | |
|---|---|---|---|
| 2011/0167177 A1 | 7/2011 | Kouyama et al. | |
| 2011/0264825 A1 | 10/2011 | Stagg et al. | |
| 2012/0200172 A1* | 8/2012 | Johnson | H04R 29/001 |
| | | | 307/116 |

FOREIGN PATENT DOCUMENTS

| | | |
|---|---|---|
| JP | 2004029963 A | 1/2004 |
| JP | 2006350451 A | 12/2006 |
| JP | 2013526149 A | 6/2013 |
| WO | 2011130026 A2 | 10/2011 |

* cited by examiner

METHOD AND APPARATUS FOR RECONFIGURING PIN ASSIGNMENTS ON A CONNECTOR

TECHNICAL FIELD

The embodiments described below relate to connectors with pin assignments and, more particularly, to a method and apparatus for reconfiguring pin assignments on a connector.

BACKGROUND

Electronic devices communicate with each other through connectors. For example, a printed circuit board (PCB) can have a multi-pin connector that is soldered to the board. The connector can interface with a cable so that each exposed conductor in the cable can electrically couple with each pin in the connector. The electronic device can communicate through the connector and cable by sending and receiving signals through the pins and conductors. The connector is typically keyed so the cable cannot be installed backwards into the connector. Sometimes, instead of a cable, the PCB can be coupled directly to another PCB. For example, input/output (I/O) devices with integrated displays and keyboards are sometimes coupled to processor boards through a mating pair connector. Similar to the connector to cable arrangement, each pin in the mating pair connector are uniquely paired with another pin in the connector.

The connectors on the PCB have pin assignments. That is, each pin in the connectors on the PCB is assigned to a specific signal. The assignments can include signals that, for example, provide+5 VDC to an I/O device, receive data from the I/O to the processor board (typically denoted as 'DATA'), interrupt a transmission through the connector, etc. To ensure interoperability of various PCBs, many standards, such as the RS-232 standard, have been developed that specify which pin in the connector is allocated to a particular signal. Although some of the standards do not assign all of the pins to a signal, such unassigned pins are oftentimes used for a proprietarysignal. As a result, some connectors are not compatible even if in technical compliance with a standard.

General purpose input and output (GPIO) connectors are also employed in many electronic devices. These connectors are able to interface with peripheral devices over several different standards. However, the connectors, due to interfacing with the different standards, are usually large and bulky and must be designed into the product. For example, a few pins might be assigned exclusively to the USB protocol whereas the other pins are assigned to SCSI or PCM protocols. Also, the GPIO connectors rely on the standards with known pin assignments rather than proprietary pin assignments that are associated with particular electronic devices.

Many PCBs employ connectors with wholly proprietary pin assignments. Concerns such as space, costs, form factor constraints, weight, licensing considerations, and minimum data rates can induce manufacturers to use proprietary pin assignments. For example, a company may develop a unique pin assignment for a custom processor board that must fit within a confined space in a product. Commonly available boards with GPIO or industry standard connectors might be too costly or too large to fit within the product. Accordingly, companies have developed proprietary pin assignments that fully utilized all of the pins on small connectors.

The connectors with such proprietary pin assignments are sometimes used between devicesthat requireupgrades or replacements. For example, a processor board with a proprietary pin assignment to an I/O connector may not be a candidate for an upgrade due to the customer's reliance on the board's processor version. However, the I/O device coupled to the I/O connector might be upgraded due to technological progress in sensors. For example, infrared buttons might be replaced by capacitive touch buttons if the capacitive touch buttons are less expensive or more reliable for a particular application.

These upgrades may require different pin assignments to work properly with the processor boards. However, the connectors have pins already assigned for a particular type of accessory. Accordingly, there is a need for an apparatus and a method of reconfiguring pin assignments on a connector.

SUMMARY

A method for reconfiguring pin assignments on a connector is provided. According to an embodiment, the method comprises reading a present accessory type from an accessory coupled to the connector having a plurality of pins wherein the present accessory type is associated with an accessory pin assignment of the connector. The method further comprises comparing the present accessory type to a stored accessory type associated with a connector pin assignment to determine if the accessory pin assignment is compatible with the connector pin assignment.

An apparatus for reconfiguring pin assignments on a connector is provided. The apparatus comprises the connector having a plurality of pins, an accessory coupled to the connector, and a processor coupled to the plurality of pins. The processor is configured to read a present accessory type from the accessory wherein the present accessory type is associated with an accessory pin assignment, compare the present accessory type to a stored accessory type associated with a connector pin assignment, and change the connector pin assignment based on the comparison between the present accessory type and the stored accessory type.

ASPECTS

According to an aspect, a method (700) for reconfiguring pin assignments on a connector (100) comprises reading a present accessory type (34a) from an accessory (30) coupled to the connector (100) having a plurality of pins (110) wherein the present accessory type (34a) is associated with an accessory pin assignment (31) of the connector (100), and comparing the present accessory type (34a) to a stored accessory type (18a) associated with a connector pin assignment (17) to determine if the accessory pin assignment (31) is compatible with the connector pin assignment (17).

Preferably, the method further comprises changing the connector pin assignment (17) to be compatible with the accessory pin assignment (31) if the accessory pin assignment (31) is incompatible with the connector pin assignment (17).

Preferably, changing the connector pin assignment (17) includes changing at least one data pin assignment to read data from the accessory (30) coupled to the connector (100).

Preferably, the stored accessory type (18a) is associated with a prior accessory (20) coupled to the connector (100) prior to the accessory (30) being coupled to the connector (100).

Preferably, the method further comprises checking a present flag (34b) of the accessory (30) to determine if additional data is required from the accessory (30) to communicate with the accessory (30).

Preferably, the present flag (34b) is associated with calibration factors determined from calibrating the accessory (30) prior to the accessory (30) being coupled to the processor board (10).

Preferably, the present flag (34b) is a unique identifier of the accessory (30). Preferably, changing the connector pin assignment (17) includes changing at least one programmable flag (19) on a processor (12) on a processor board (10) that is coupled to the connector (100) to change the connector pin assignment (17).

Preferably, the stored accessory type (18a) was provided by a prior accessory (20) coupled to the connector (100) prior to the accessory (30) being coupled to the connector (100).

Preferably, the present accessory type (34a) is read through at least one of the plurality of pins (110) commonly assigned in at least two accessory pin assignments (21, 31).

According to an aspect, an apparatus (600) for reconfiguring pin assignments on a connector (100) comprises the connector (100) having a plurality of pins (110), an accessory (30) coupled to the connector (100), and a processor (12) coupled to the plurality of pins (110), the processor (12) being configured to read a present accessory type (34a) from the accessory (30) wherein the present accessory type (34a) is associated with an accessory pin assignment (31), compare the present accessory type (34a) to a stored accessory type (18a) associated with a connector pin assignment (17), and change the connector pin assignment (17) based on the comparison between the present accessory type (34a) and the stored accessory type (18a).

Preferably, the processor (12) is further configured to determine if the accessory pin assignment (31) is compatible with the connector pin assignment (17) based on the comparison between the present accessory type (34a) and the stored accessory type (18a).

Preferably, the processor (12) is further configured to change at least one data pin assignment in the connector pin assignment (17) to read data from the accessory (30).

Preferably, the stored accessory type (18a) is associated with a prior accessory (20) coupled to the connector (100) prior to the accessory (30) being coupled to the connector (100).

Preferably, the processor (12) being further configured to check a present flag (34b) of the accessory to determine if additional data is required from the accessory (30) to communicate with the accessory (30).

Preferably, the present flag (34b) is associated with calibration factors determined from calibrating the accessory (30) prior to the accessory (30) being coupled to the processor board (10).

Preferably, the present flag (34b) is a unique identifier of the accessory (30).

Preferably, the processor (12) is configured to change at least one programmable flag (19) on the processor (12) to change the connector pin assignment (17).

Preferably, the processor (12) is further configured to read the present accessory type (34a) through at least one of the plurality of pins (110) commonly assigned in at least two accessory pin assignments (21, 31).

Preferably, the processor (12) is further configured to store the stored accessory type (18a) prior to the accessory (30) being connected to the connector (100).

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of embodiments of a method of reconfiguring a pin assignment. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the method of reconfiguring the pin assignment. As a result, the embodiments described below are not limited to the specific examples described below, but only by the claims and their equivalents.

Figure 1:
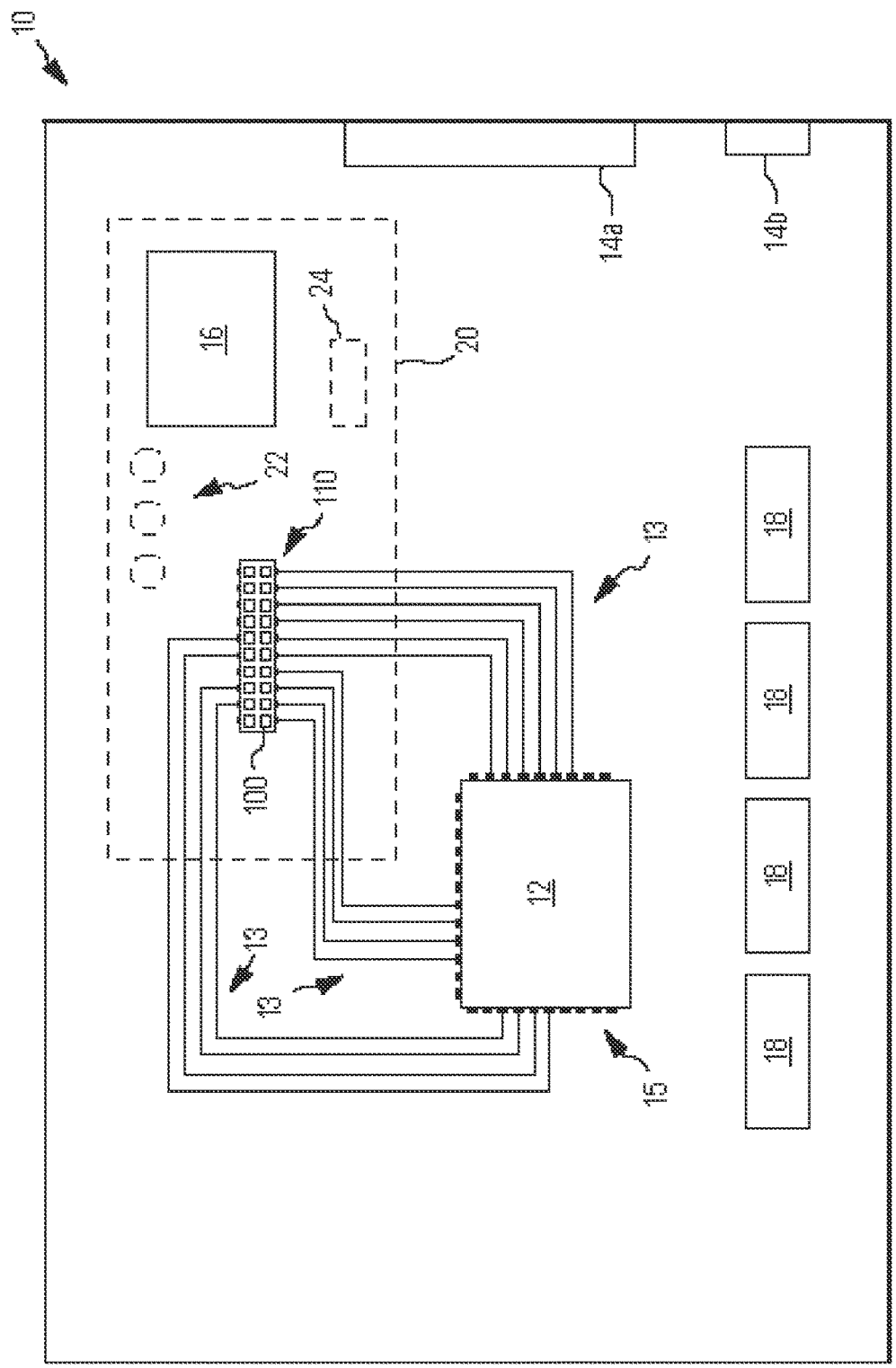
FIG. 1 shows a plan view of a processor board 10 according to an embodiment.

FIG. 1 shows a plan view of a processor board 10 according to an embodiment. As shown, the processor board 10 includes a connector 100 that is coupled to a substrate on the processor board 10. The connector 100 is a mating pair with only the female half of the pair shown. The male portion is not shown for clarity. The processor board 10 also includes a processor 12, a plurality of communication ports 14a, 14b, a communications chip 16, and memory 18. However, different configurations can be employed in alternative embodiments. As can be seen, the connector 100 is coupled to the processor 12 via pathways 13 (all the pathways are not shown for clarity). The pathways 13 couple pins on the processor 12 to pins 110 on the connector 100. Each of the pathways 13 carry signals that are related to a particular function. The processor 12 has programmable flags that can be configured to associate a signal to a particular pin 15 on the processor 12.

Also shown is a first accessory 20 that is coupled to the processor board 10 via the connector 100. The first accessory 20 is shown in transparent view for clarity. In the embodiment shown, the first accessory 20 includes an accessory memory 24 and buttons 22. The buttons 22 may be infrared buttons although any suitable input device can be employed in alternative embodiments. The first accessory 20 can also have different configurations and perform different functions. For example, although the first accessory 20 is an I/O device, in alternative embodiments, the first accessory 20 can be any device such as a display, a second processor board, communications board, memory card, or the like. The buttons 22 and accessory memory 24 are coupled to the connector 100 via pathways (not shown). In alternative embodiments, the buttons 22 and accessory memory 24 can be coupled to the connector 100 through an interface, buffer, or the like.

The accessory memory 24 is an EEPROM that is adapted to store data although any suitable memory for storing the data can be employed in alternative embodiments. The data can be associated with the first accessory 20. For example, the data could indicate that the first accessory 20 has the infrared buttons 22. The accessory memory 24 can also provide the data to another device such as the processor 12. The processor 12 can receive that data from the accessory memory 24 through the connector 100. Additionally or alternatively, the data can be provided through a second connector, a wireless communication, an optocoupler, or the like.

Figure 2:
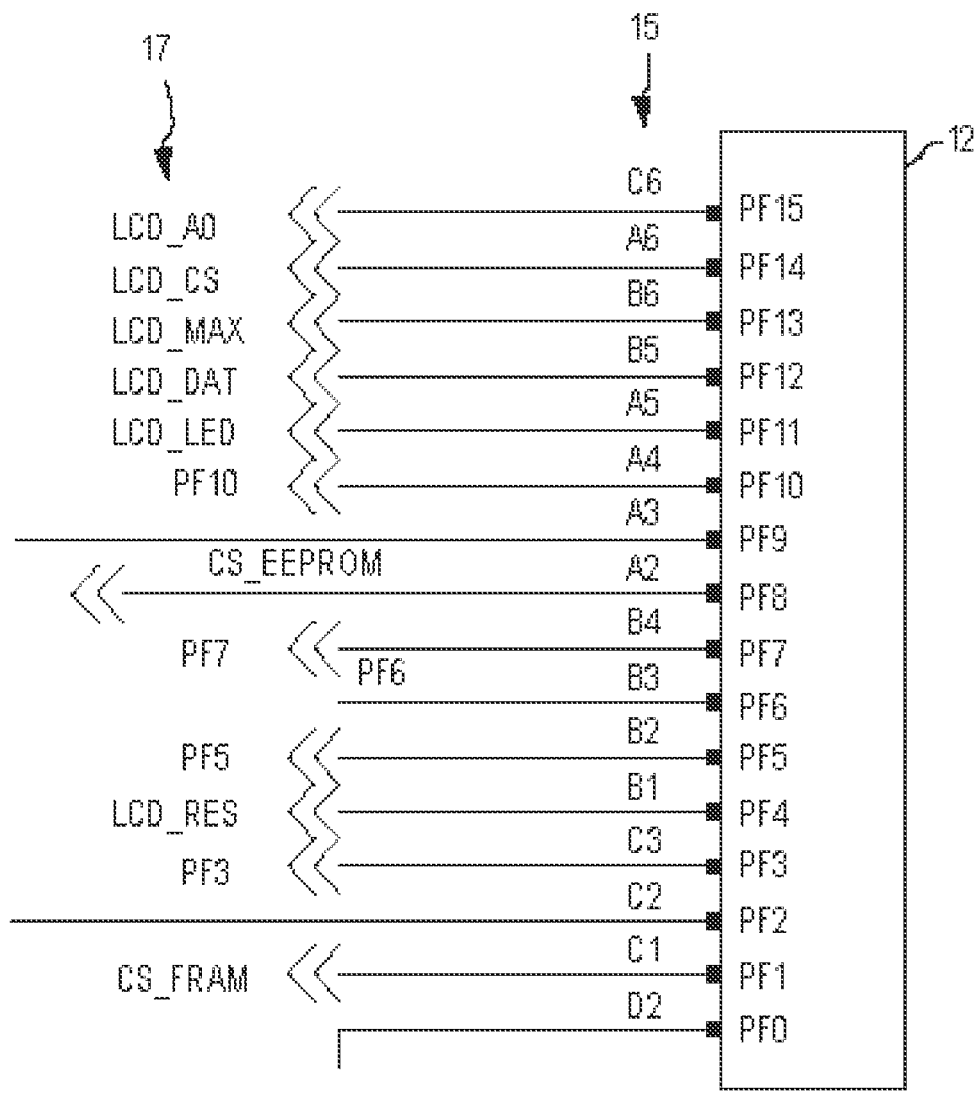
FIG. 2 shows a schematic representation of a portion of the processor 12.

FIG. 2 shows a schematic representation of a portion of the processor 12. As can be seen, the processor 12 includes programmable flags 19 that are labeled PF15-PF0. Each programmable flag 19 is associated with a processor pin 15. For example, the programmable flag 19 labeled P15 is associated with pin C6. Programmable flag 19 labeled PF0 is associated with pin D2. In alternative embodiments, more or fewer programmable flags 19 can be employed and pin configurations can be employed. The pins 15 are also shown as having corresponding signals. The signals shown are associated with the first accessory 20. The assignment of the signals to the corresponding pins 110 is a connector pin assignment 17.

In the embodiment shown, the connector pin assignment 17 is associated with the buttons 22, which are infrared, on the first accessory 20. In alternative embodiments, the connector pin assignment 17 can be associated with other accessories such as a hard drive, mechanical keyboard, display, etc. The connector pin assignment 17 includes signals such as CS_MAX which can be an accessory chip select signal. The accessory chip (not shown) can control the buttons 22. The BTN DATx can be data from the buttons 22 such as a signal indicating the corresponding button is pressed. These and other signals are shown in the following table.

| Assignment | Signal |
| --- | --- |
| CS_MAX | MAX chip select. |
| BTN_DAT | Data for IR buttons. |
| BTN_DAT0 | Data for button 1. |
| BTN_DAT1 | Data for button 2. |
| 3.3V_FB | Power supply. |
| LCD_CS | LCD chip select. |
| SCK | Serial clock for serial communication |
| MOSI | Master Output Slave Input. Serial output for master and input for slave. |
| LCD_A0 | Indicates that registers on MAX chip are display data. |
| LCD_RES | LCD reset. |
| PWM_IR | Provides a clock for the MAX chip. |
| FB_LED | Control button feedback LED. |
| CS_EEPROM | EEPROM chip select. |
| MISO | Master Input Slave Output. Serial input for master and output for slave. |

In an embodiment, programmable flags 19 can be configured during the initialization of the processor board 10. Accordingly, the processor 12 is configured with the connector pin assignment 17, which can be compatible with the first accessory 20, as discussed in more detail in the following.

Figure 3:
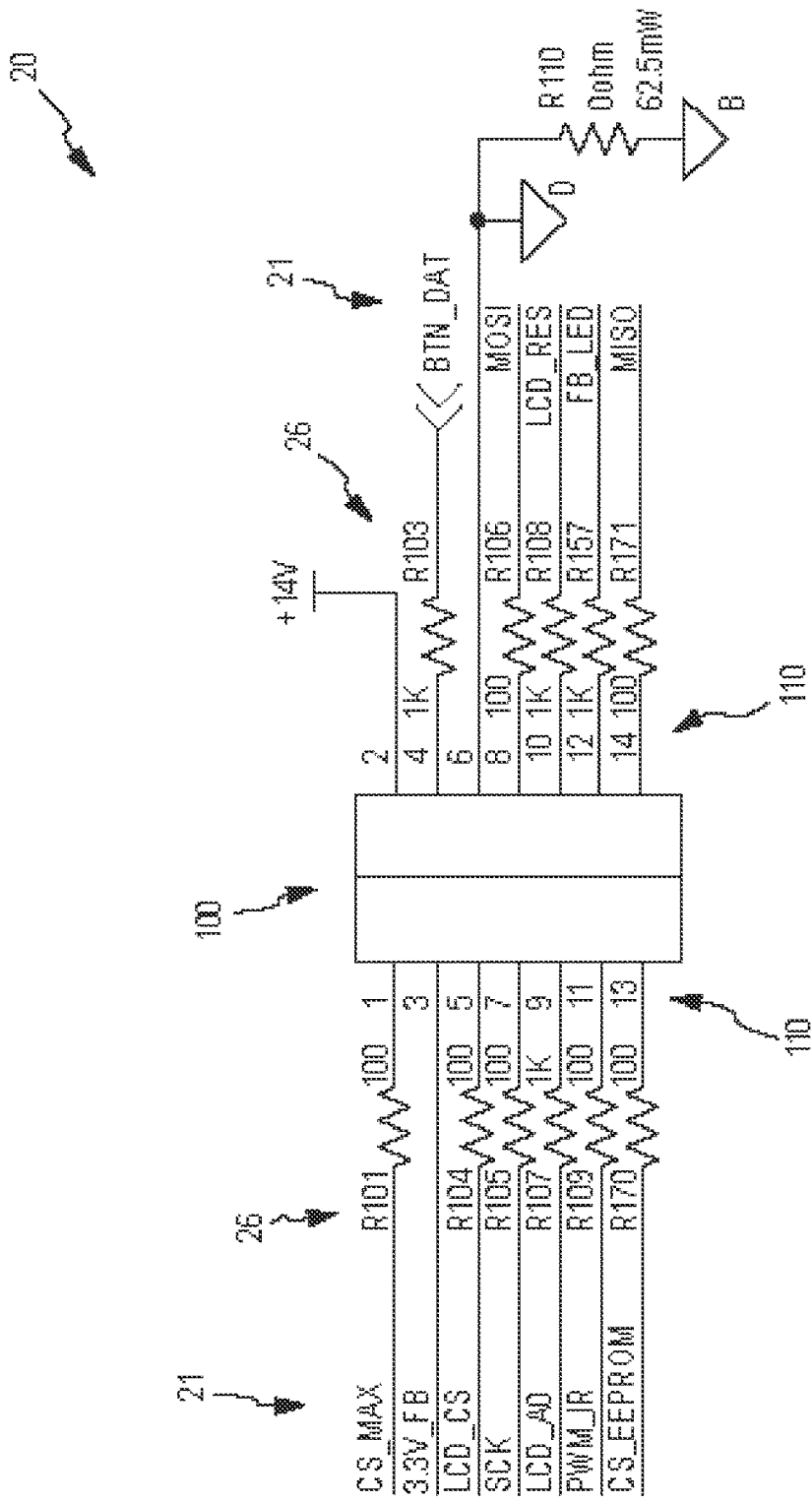
FIG. 3 shows a schematic representation of the first accessory 20.

FIG. 3 shows a schematic representation of the first accessory 20. The connector 100 is shown with the exemplary connector pin assignment 17 described with reference to FIG. 2. The connector 100 includes the plurality of pins 110 numbered 1-14 although other connectors can be employed in alternative embodiments. As can be seen, each of the signals is associated with one of the pins 110 on the connector 100. The set of signals being assigned to the plurality of pins 110 is an accessory pin assignment 21. As can be appreciated, all of the pins 110 on the connector 100 are assigned to a signal. Accordingly, none of the pins 110 are available for additionally needed signals. To be compatible with the accessory pin assignment 21, the connector pin assignment 17 is configured as shown in FIG. 2. The connector pin assignment 17 can be reconfigured when a different accessory is coupled to the connector 100, as will be described in more detail in the following.

Figure 4:
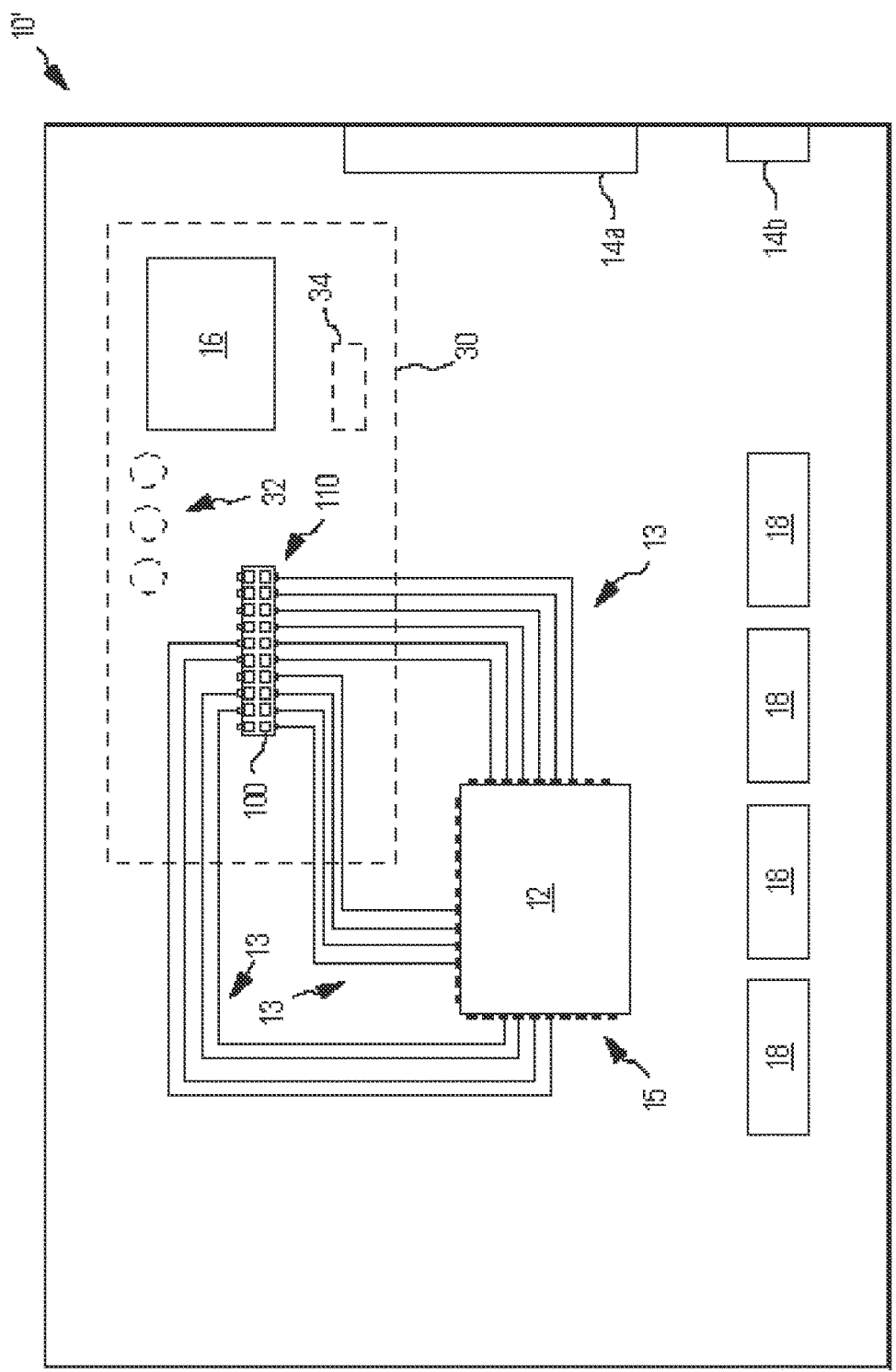
FIG. 4 shows another top plan view of the processor board 10 with the connector 100 according to an embodiment.

FIG. 4 shows another top plan view of the processor board 10 with the connector 100 according to an embodiment. Instead of the first accessory 20, a second accessory 30 is coupled to the processor board 10. In an embodiment, the connector pin assignment 17 in the processor board 10 can be changed to be compatible with the second accessory 30. Similar to the first accessory 20, the second accessory 30 includes an accessory memory 34 and buttons 32. However, the second accessory buttons 32 are different than the buttons 22 on the first accessory 20. For example, the buttons 22 on the first accessory 20 may be infrared buttons. The buttons 32 on the second accessory 30 might be capacitive touch buttons. The difference between the two button types can include different data protocol, number of pins needed, voltage required, etc. These and other differences between the buttons 22, 32 can require changing the connector pin assignments 17.

Figure 5:
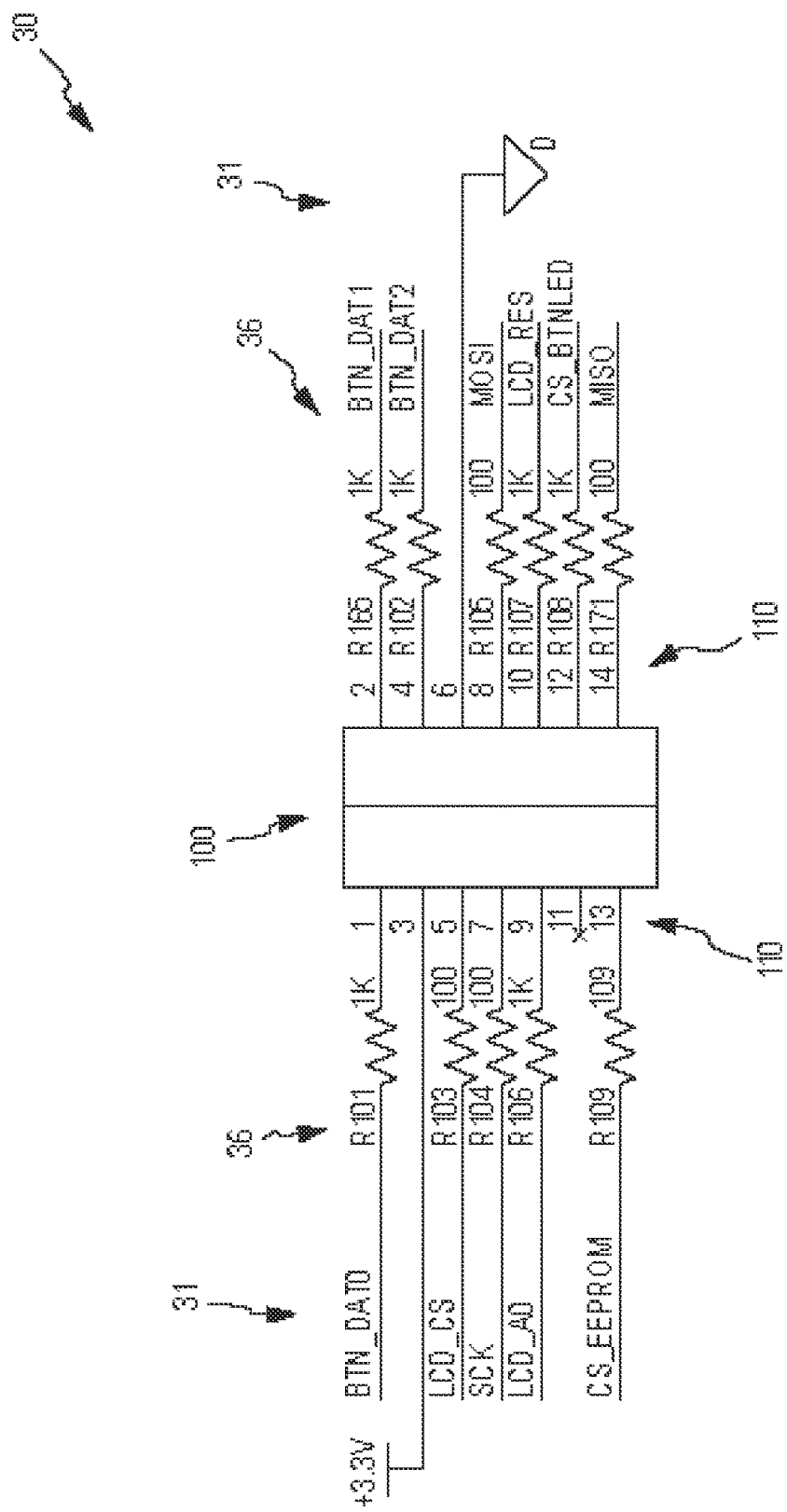
FIG. 5 shows a schematic representation of another accessory 30 according to an embodiment.

FIG. 5 shows a schematic representation of another accessory 30 according to an embodiment. The set of signals being assigned to the plurality of pins 110 is a second accessory pin assignment 31. As can be appreciated when comparing FIG. 5 with FIG. 3, the first and the second accessory pin assignments 21, 31 have some commonly assigned pins. For example, the MISO signal is assigned to pin 14 in both the first and the second accessory pin assignments 21, 31. Other pins are commonly assigned. These commonly assigned pins can be employed to initialize and read data from the accessories 20, 30 even though the connector pin assignment 17 has not been changed. The data read can include data associated with the second accessory 30. Using this data, the connector pin assignment 17 can be changed to be compatible with the accessory pin assignment 31. In the embodiment shown in FIGS. 4 and 5, the connector pin assignment 17 is changed after the second accessory 30 is coupled to the connector 100.

The connector pin assignment 17 can be changed by reassigning some of the connector pins 110. In the embodiments of the first and second accessories 20, 30, pins 1, 2, and 4 were reassigned. More specifically, pin 1 was reassigned from the CS_MAX signal to the BTN_DAT0 signal. Pin 2 was assigned from voltage supply +14V to BTN_DAT1. Pin 4 was reassigned from BTN_DAT to BTN_DAT2. Pins that were not reassigned include the PWM_IR and the SCK pins. The connector pin assignment 17 can be changed by reprogramming the programmable flags 19 that are associated with each pin 15 on the processor 12. The method and apparatus for reconfiguring the pin assignments on the connector 100 are described in more detail in the following with reference to FIGS. 6 and 7.

Figure 6:
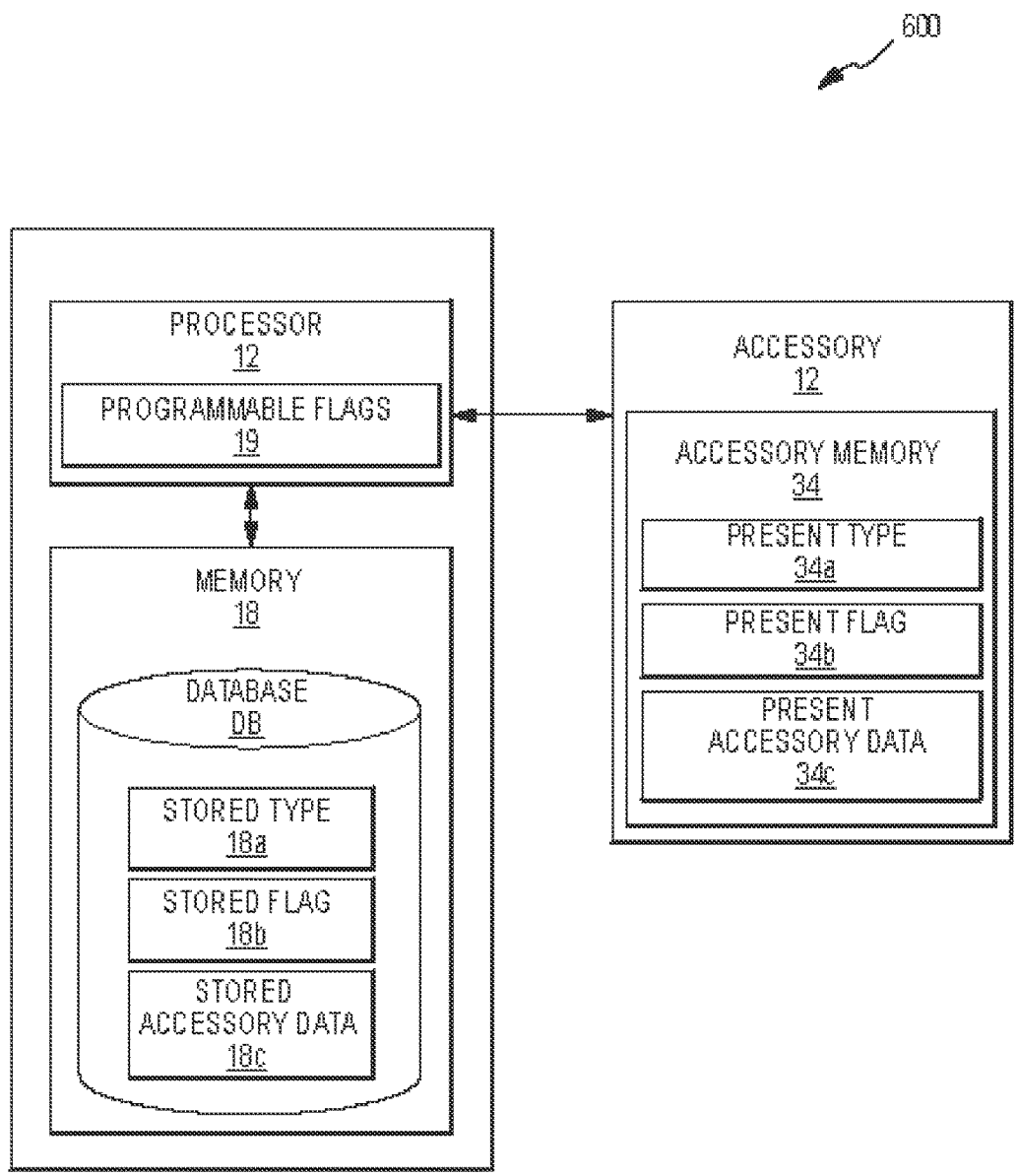
FIG. 6 shows a block diagram representation of an apparatus 600 for reconfiguring the pin assignments on the connector 100.

FIG. 6 shows a block diagram representation of an apparatus 600 for reconfiguring the pin assignments on the connector 100. In the embodiment shown, the apparatus 600 for reconfiguring the pin assignments includes the processor board 10 and the second accessory 30. The processor board 10 includes the processor 12, the memory 18, and the programmable flags 19. The memory 18 is shown as having a database DB. The database DB includes a stored accessory type 18a, stored flag 18b, and stored accessory data 18c. The accessory memory 34 in the second accessory 30 includes a present accessory type 34a, a present flag 34b, and a present accessory data 34c. An arrow between the processor 12 and the second accessory 30 is a representation of the connector 100 according to an embodiment. The present accessory type 34a can be read by the processor 12 through the connector 100.

The present accessory type 34a can be a value that is associated with the type of the second accessory 30. For example, in an embodiment, the present accessory type 34a can indicate the type of button 34 that is used on the second accessory 30. Although the second accessory 30 has capacitive touch buttons 32, other button types can be employed in alternative embodiments. The present accessory type 34a can also indicate that the second accessory 30 has other features like a display or other I/O components. Also stored in the accessory memory 34 are the present flag 34b and the present accessory data 34c.

The present flag 34b can be a unique identifier of the second accessory 30. For example, some accessories may require calibration or testing. The calibration and testing can write values to the accessory memory 34 that are particular to the second accessory 30. The values can be calibration factors for buttons in the accessory, although capacitive touch buttons may not employ calibration factors. These and other values can be written to the accessory memory 34 as the present accessory data 34c.

In the embodiments shown, the stored accessory type and flag 18a,b can be provided by the first accessory 20 coupled to the processor board 10 before the second accessory 30. For example, prior to initializing the second accessory 30, the stored accessory type 18a can be associated with a connector pin assignment 17 that is compatible with the first accessory 20. The stored flag 18b can be associated with the values, such as calibration values, that are associated with the first accessory 20. In the embodiments described in the foregoing, the first accessory 20 can be referred to as a prior accessory. In alternative embodiments, any accessory can be the prior accessory. The method of reconfiguring the pin assignments is illustrated with the embodiment where the first accessory 20 is the prior accessory and the second accessory 30 is coupled to the processor board 10.

Figure 7:
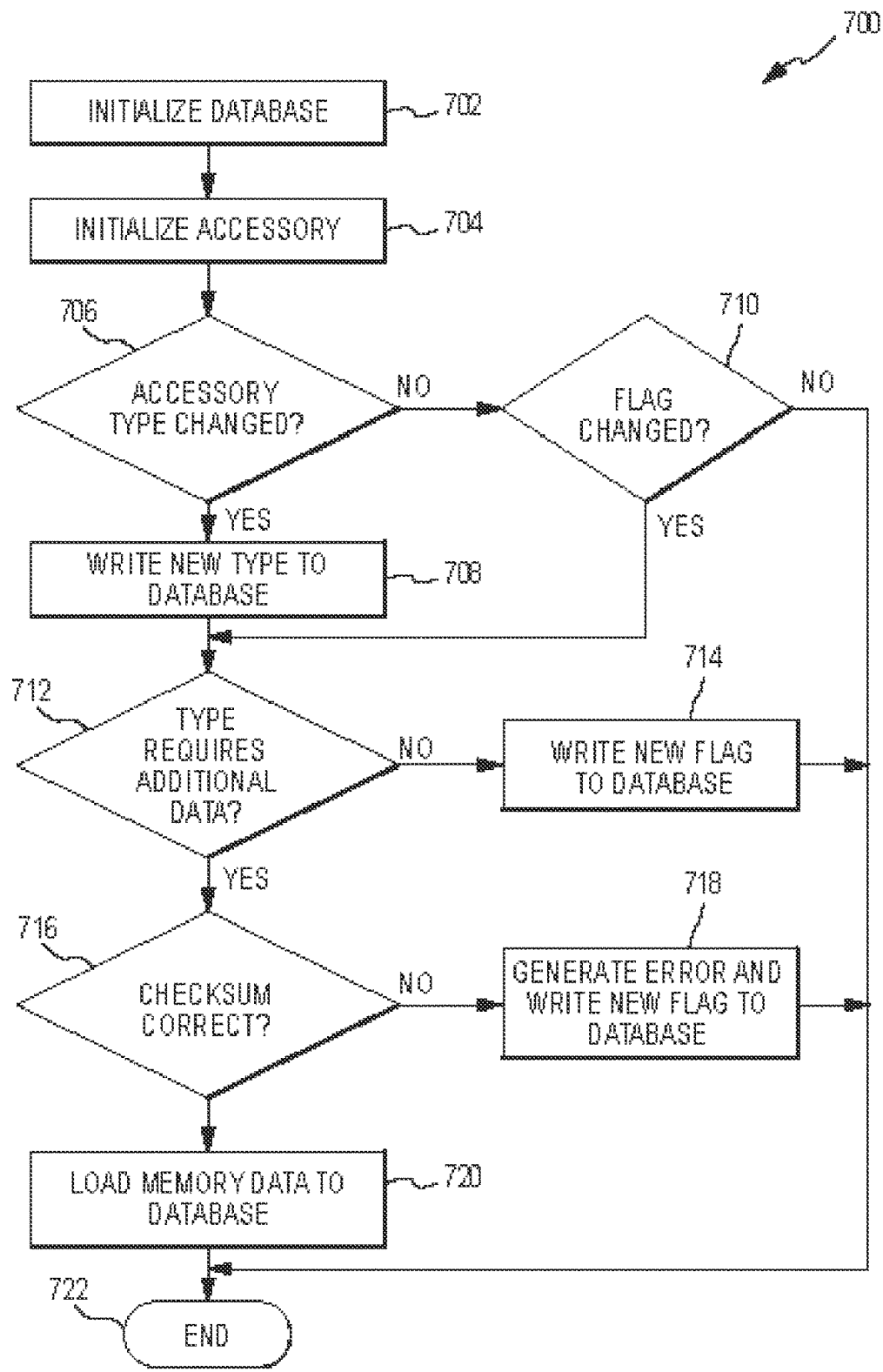
FIG. 7 shows a flow chart illustrating a method 700 of reconfiguring pin assignments on the connector 100 according to an embodiment.

FIG. 7 shows a flow chart illustrating a method 700 of reconfiguring pin assignments on the connector 100 according to an embodiment. The method 700 includes initializing the database 702, initializing the accessory 704, and an accessory type check 706. After the accessory type check 706, a write new type 708 or a flag check 710 can occur. An additional data check 712 can occur after the flag check 710. A write new flag 714 or a checksum 716 occurs after the additional data check 712. From the checksum 716, the method 700 can generate an error and write a new flag 718 or load memory data to the database 720. The method ends at step 722.

The initialize database 702 step can include initializing the database DB described with reference to FIG. 6. The initialize database 702 can occur when the processor board 10 receives power, the software on the processor 12 issues a command to initialize the database DB, or by any other appropriate means. The initialize database 702 step can be comprised of checking the database DB for data, the size of the database DB, the schema, writing data to the database DB, or the like. For example, the processor board 10 can include other memory, such as non-volatile memory, that stores data for the database DB when power is lost to the processor board 10. The initialize database 702 step can read data from the non-volatile memory and write the data into the database DB.

The initialize accessory 704 step can occur when the second accessory 30 is coupled to the processor board 10. The initialize accessory 704 step can also occur at other times such as when the processor board 10 is initialized or receives power. The initialize accessory 704 step may be comprised of providing power to the second accessory 30 through the connector 100. The power can be provided when the second accessory 30 is coupled to the connector 100. The initialize accessory 704 step can also be comprised of other routines such as hardware verifications and data integrity checks.

The initialize accessory 704 step also includes reading the present accessory type 34a from the accessory memory 34. The processor 12 can read the present accessory type 34a from the accessory memory 34 over a pin in the connector 100. For example, in the embodiments of the connector 100 described in the foregoing, the present accessory type 34a can be read through the MISO pin 14. As discussed in the foregoing, pin 14 is assigned to the MISO signal in both the first and second accessory pin assignments 21, 31. Additionally, the CS_EEPROM on pin 13 can be enabled prior to reading the present accessory type 34a from the accessory memory 34. Enabling the CS_EEPROM can allow the accessory memory 34 to be read and written to the database DB. After the initialize database 702 and initialize accessory 704 steps, the accessory type check 706 can be performed.

The accessory type check 706 determines if the accessory type has changed. For example, the accessory type check 706 can determine if the present accessory type 34a is different than the stored accessory type 18a. If the types 34a, 18a are different, the accessory pin assignment 31 might not be compatible with the connector pin assignment 17. In the exemplary embodiments described in the foregoing, the accessory pin assignments 31, 21 are different and incompatible. Accordingly, when the second accessory 30 is coupled to the processor board 10, the second accessory pin assignment 31 is not compatible with the connector pin assignment 17.

The write new type 708 step occurs if the accessory type check 706 indicates that the accessory type is different. The new type can be the present accessory type 34a read from the accessory memory 34 and written to the database DB. For example, the processor board 10 can read the present accessory type 34a from the accessory memory 34 through the connector 100. Although the connector pin assignment 17 might be incompatible with the accessory pin assignment 31, the two configurations can still have commonly assigned pins. As discussed in the foregoing, these commonly assigned pins can be employed to read data, such as the accessory type, from the second accessory memory 34.

The flag check 710 occurs if the accessory type check 706 indicates that the accessory type has not changed. During the flag check 710, the present flag 34b is compared with the stored flag 18b. If the comparison indicates that the stored flag 18b has not changed, then the method ends. Accordingly, if the second accessory 30 has an accessory pin assignment 31 that is compatible with the connector pin assignment 17, then the method does not write the new type to the database DB and the stored flag 18b is not changed. If the comparison between the stored flag 18b and the present flag 34b are different, then the method 700 executes an additional data check 712.

In some embodiments, the first and second accessories can be the same type but have different flags. For example, in alternative embodiments, the first and the second accessories could be IR button types with different calibration values. Accordingly, the first and second accessories are the same type of accessory but have a present flag that is different than the stored flag. The calibration or other values stored in the present accessory data 34c may need to be read from the accessory memory 34 and written to the database DB. This decision is made in the additional data check 712.

The additional data check 712 can follow the write new type 708 step or the flag check 710. The additional data check 712 determines if additional data is required from the accessory memory 34. For example, the second accessory 30 can, in some embodiments, have data that needs to be written to the database DB. In the embodiment where the second accessory 30 is a capacitive touch button type, additional data may not be required. In other embodiments, the additional data check can check if the type is associated with having calibration values. If the additional data check 712 indicates that additional data is not necessary, the method may write a new flag to the database 714 and end 722.

If additional data is needed, the checksum 716 step verifies the integrity of the data in the accessory memory 34. If the checksum 716 verifies the integrity of the data, the load memory data to database 720 step can execute. The additional data can be loaded into the database DB through the connector 100. In alternative embodiments, the additional data can be loaded through other communications means.

The embodiments described above provide a method 700 and apparatus 600 for reconfiguring the pin assignments on a connector 100. As explain above, the method 700 and apparatus 600 can read the present accessory type 34a from the second accessory 30. The method can use the present accessory type 34a to determine if the connector pin assignment 17 is not compatible with the accessory pin assignment 31. The method 700 and apparatus 600 can reconfigure the connector pin assignment 17 to be compatible with the second accessory pin assignment 31.

When the second accessory 30 is coupled to the processor board 10, the accessory pin assignment 31 might not be compatible with the connector pin assignment 17. However, the accessory pin assignment 31 can have pins that are commonly assigned with the connector pin assignment 17, including pins that provide power to the second accessory 30. Accordingly, even if the accessory pin assignment 31 is not compatible with the connector pin assignment 17, the second accessory 30 can be initialized and data can be read from the accessory memory 34. The data can include the present accessory type 34a, present flag 34b, and the present accessory data 34c. The present accessory type 34a, present flag 34b, and the present accessory data 34c can be read through commonly assigned pins on the connector 100. Accordingly, the connector pin assignment 17 can be configured for the first accessory 20 and still provide data to the processor board 10 to change the connector pin assignment 17. Accordingly, the pin assignments on the connector 100 can be reconfigured even if the connector 100 has pins already assigned for a particular type of accessory.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other connectors, and not just to the embodiments described above and shown in the accompanying figures. Accordingly, the scope of the embodiments described above should be determined from the following claims.

I claim:

1. A method (700) for reconfiguring pin assignments on a connector (100), the method comprising:
   reading a present accessory type (34a) from an accessory memory (34) in an accessory (30) coupled to the connector (100) having a plurality of pins (110), wherein the present accessory type (34a) is associated with an accessory pin assignment (31) of the connector (100);
   comparing the present accessory type (34a) to a stored accessory type (18a) associated with a connector pin assignment (17) to determine if the accessory pin assignment (31) is compatible with the connector pin assignment (17); and
   reading a present flag (34b) from the accessory memory (34) in the accessory (30) to determine if additional data in addition to the present accessory type (34a) is required from the accessory (30) to communicate with the accessory (30).

2. The method of claim 1, further comprising changing the connector pin assignment (17) to be compatible with the accessory pin assignment (31) if the accessory pin assignment (31) is incompatible with the connector pin assignment (17).

3. The method of claim 2, wherein changing the connector pin assignment (17) includes changing at least one data pin assignment to read data from the accessory (30) coupled to the connector (100).

4. The method of claim 1, wherein the stored accessory type (18a) is associated with a prior accessory (20) coupled to the connector (100) prior to the accessory (30) being coupled to the connector (100).

5. The method of claim 1, wherein the present flag (34b) is associated with calibration factors determined from calibrating the accessory (30) prior to the accessory (30) being coupled to a processor board (10).

6. The method of claim 1, wherein the present flag (34b) is a unique identifier of the accessory (30).

7. The method of claim 1, wherein changing the connector pin assignment (17) includes changing at least one programmable flag (19) on a processor (12) on a processor board (10) that is coupled to the connector (100) to change the connector pin assignment (17).

8. The method of claim 1, wherein the stored accessory type (18a) was provided by a prior accessory (20) coupled to the connector (100) prior to the accessory (30) being coupled to the connector (100).

9. The method of claim 1, wherein the present accessory type (34a) is read through at least one of the plurality of pins (110) commonly assigned in at least two accessory pin assignments (21, 31).

10. An apparatus (600) for reconfiguring pin assignments on a connector (100), comprising:
- the connector (100) having a plurality of pins (110);
- an accessory (30) coupled to the connector (100); and
- a processor (12) coupled to the plurality of pins (110), the processor (12) being configured to:
  - read a present accessory type (34*a*) from an accessory memory (34) in the accessory (30), wherein the present accessory type (34*a*) is associated with an accessory pin assignment (31);
  - compare the present accessory type (34*a*) to a stored accessory type (18*a*) associated with a connector pin assignment (17);
  - read a present flag (34*b*) from the accessory memory (34) in the accessory (30) to determine if additional data in addition to the present accessory type (34*a*) is required from the accessory (30) to communicate with the accessory (30); and
  - change the connector pin assignment (17) based on the comparison between the present accessory type (34*a*) and the stored accessory type (18*a*).

11. The apparatus of claim 10, wherein the processor (12) is further configured to determine if the accessory pin assignment (31) is compatible with the connector pin assignment (17) based on the comparison between the present accessory type (34*a*) and the stored accessory type (18*a*).

12. The apparatus of claim 10, wherein the processor (12) is further configured to change at least one data pin assignment in the connector pin assignment (17) to read data from the accessory (30).

13. The apparatus of claim 10, wherein the stored accessory type (18*a*) is associated with a prior accessory (20) coupled to the connector (100) prior to the accessory (30) being coupled to the connector (100).

14. The apparatus of claim 10, wherein the present flag (34*b*) is associated with calibration factors determined from calibrating the accessory (30) prior to the accessory (30) being coupled to a processor board (10).

15. The apparatus of claim 10, wherein the present flag (34*b*) is a unique identifier of the accessory (30).

16. The apparatus of claim 10, wherein the processor (12) is configured to change at least one programmable flag (19) on the processor (12) to change the connector pin assignment (17).

17. The apparatus of claim 10, wherein the processor (12) is further configured to read the present accessory type (34*a*) through at least one of the plurality of pins (110) commonly assigned in at least two accessory pin assignments (21, 31).

18. The apparatus of claim 10, wherein the processor (12) is further configured to store the stored accessory type (18*a*) prior to the accessory (30) being connected to the connector (100).

* * * * *

UNITED STATES PATENT AND TRADEMARK OFFICE
CERTIFICATE OF CORRECTION

Page 1 of 1

PATENT NO. : 10,430,365 B2
APPLICATION NO. : 15/119781
DATED : October 1, 2019
INVENTOR(S) : Lingjun Wang It is certified that error appears in the above-identified patent and that said Letters Patent is hereby corrected as shown below:

In the Specification

Column 1, Line 32, replace "provide+5 VDC to" with --provide +5VDC to--.

Signed and Sealed this
Second Day of June, 2020

Andrei Iancu
*Director of the United States Patent and Trademark Office*